(12) United States Patent
Kim et al.

(10) Patent No.: US 8,225,216 B2
(45) Date of Patent: Jul. 17, 2012

(54) IMAGE PRODUCTION SYSTEM, APPARATUS, AND METHOD USING USER DATA OF MOBILE COMMUNICATION TERMINAL

(75) Inventors: Jung Hun Kim, Busan Metropolitan (KR); Young Ho Rhee, Seoul (KR); Jae Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1051 days.

(21) Appl. No.: 12/108,928

(22) Filed: Apr. 24, 2008

(65) Prior Publication Data

US 2008/0270917 A1 Oct. 30, 2008

(30) Foreign Application Priority Data

Apr. 30, 2007 (KR) .................. 10-2007-0042156

(51) Int. Cl.
*G06F 3/048* (2006.01)
(52) U.S. Cl. ........ 715/745; 715/765; 715/771; 715/825; 715/864
(58) Field of Classification Search .................. 715/745, 715/765, 771, 825, 864
See application file for complete search history.

(56) References Cited

U.S. PATENT DOCUMENTS

| 6,667,748 B1 * | 12/2003 | Hubbe et al. .................. 715/723 |
| 2003/0069800 A1 * | 4/2003 | Marshall et al. ................ 705/26 |
| 2007/0262950 A1 * | 11/2007 | Lai et al. ....................... 345/156 |

* cited by examiner

*Primary Examiner* — Namitha Pillai
(74) *Attorney, Agent, or Firm* — The Farrell Law Firm, P.C.

(57) ABSTRACT

An image production system, image production apparatus, and image production method are disclosed, which sort user data received from a mobile communication terminal based on at least one type of the user data; display the sorted user data on a daily record page; produce the images from user data which are selected from the displayed user data and which serve as a source; and play back the produced images on a certain region of the daily record page. All the user data of the mobile communication terminal can be easily checked through the daily record page.

19 Claims, 11 Drawing Sheets

IMAGE PRODUCTION SYSTEM, APPARATUS, AND METHOD USING USER DATA OF MOBILE COMMUNICATION TERMINAL

PRIORITY

This application claims priority under 35 USC §119 to an application entitled "IMAGE PRODUCTION SYSTEM, APPARATUS, AND METHOD USING USER DATA OF MOBILE COMMUNICATION TERMINAL" filed in the Korean Intellectual Property Office on Apr. 30, 2007 and assigned Serial No. 2007-0042156, the contents of which are incorporated herein by reference.

BACKGROUND OF THE INVENTION

1. Field of the Invention

The present invention relates to technology for the use of user data in mobile communication terminals, and more particularly, to an image production system, apparatus, and method that produce images using user data of a mobile communication terminal.

2. Description of the Related Art

As mobile communication terminal technology has developed, mobile communication terminals can now process voice calls regardless of time and place. While such mobile communication terminals add a variety of functions, they provide user data, such as text messages, multimedia messages, images, MP3 files, and games, etc., that users access them through the displays thereof.

Such user data can be sorted according to its properties and then be provided to users. Users can read the sorted user data through various menus. The users can directly read the user data through the mobile communication terminal. The user data can also be read through a computer or a web server to which application programs of mobile communication service providers or mobile communication terminal manufacturers are installed.

As such, use of the user data is limited in that users can only read the data through a mobile communication terminal, computer, or web server or just transmit it from their systems to other mobile communication terminals, computers, or web servers.

SUMMARY OF THE INVENTION

The present invention is made to solve at least the above problems, and therefore, the present invention provides means for conveniently producing images using user data.

The present invention further provides an image production system, apparatus, and method that receive user data from a mobile communication terminal, display the user data, and produce images from the user data selected by a user. The user data selected by a user can be read by playing back the produced images.

In accordance with an aspect of the present invention, a method for producing images using user data of a mobile communication terminal, includes sorting the user data received from the mobile communication terminal based on at least one type of the user data; extracting user data of a certain time period from the sorted user data and displaying on a daily record page the user data in the order that the user data was created; producing the images from user data which is selected from the displayed user data and which serves as a source; and playing back the produced images on a certain region of the daily record page.

In accordance with another aspect of the present invention, an apparatus for producing images using user data of a mobile communication terminal, includes a data display unit for sorting the user data received from the mobile communication terminal based on at least one type of the user data, extracting user data of a certain time period from the sorted user data, and displaying on a daily record page the user data in the order that the user data was created; an image production unit for producing the images from user data selected from the displayed user data, which serves as a source; and an image reproduction unit for playing back the produced images on a region of the daily record page.

In accordance with another aspect of the present invention, a system for producing images using user data of a mobile communication terminal, includes a mobile communication terminal having the user data; and an image production apparatus for receiving the user data from the mobile communication terminal and for producing the images based on the received user data. The image production apparatus includes a data display unit for sorting the user data received from the mobile communication terminal based on at least one type of the user data, extracting user data of a certain time period from the sorted user data, and displaying on a daily record page the user data in the order that the user data was created; an image production unit for producing the images from user data selected from the displayed user data, which serves as a source; and an image reproduction unit for playing back the produced images on a region of the daily record page.

BRIEF DESCRIPTION OF THE DRAWINGS

The objects, features, and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

A mobile communication terminal according to the present invention refers to communication terminals that can perform wired/wireless communication, such as a digital broadcasting terminal, a Personal Digital Assistant (PDA), a smart phone, an International Mobile Telecommunication 2000 (IMT-2000) terminal, a Wideband Code Division Multiple Access (WCDMA) terminal, and a Universal Mobile Telecommunication Service (UMTS) terminal, etc. A computer also refers to communication terminals that can perform wired/wireless communication, such as a personal computer, a desktop computer, and a laptop computer, etc.

Figure 1:
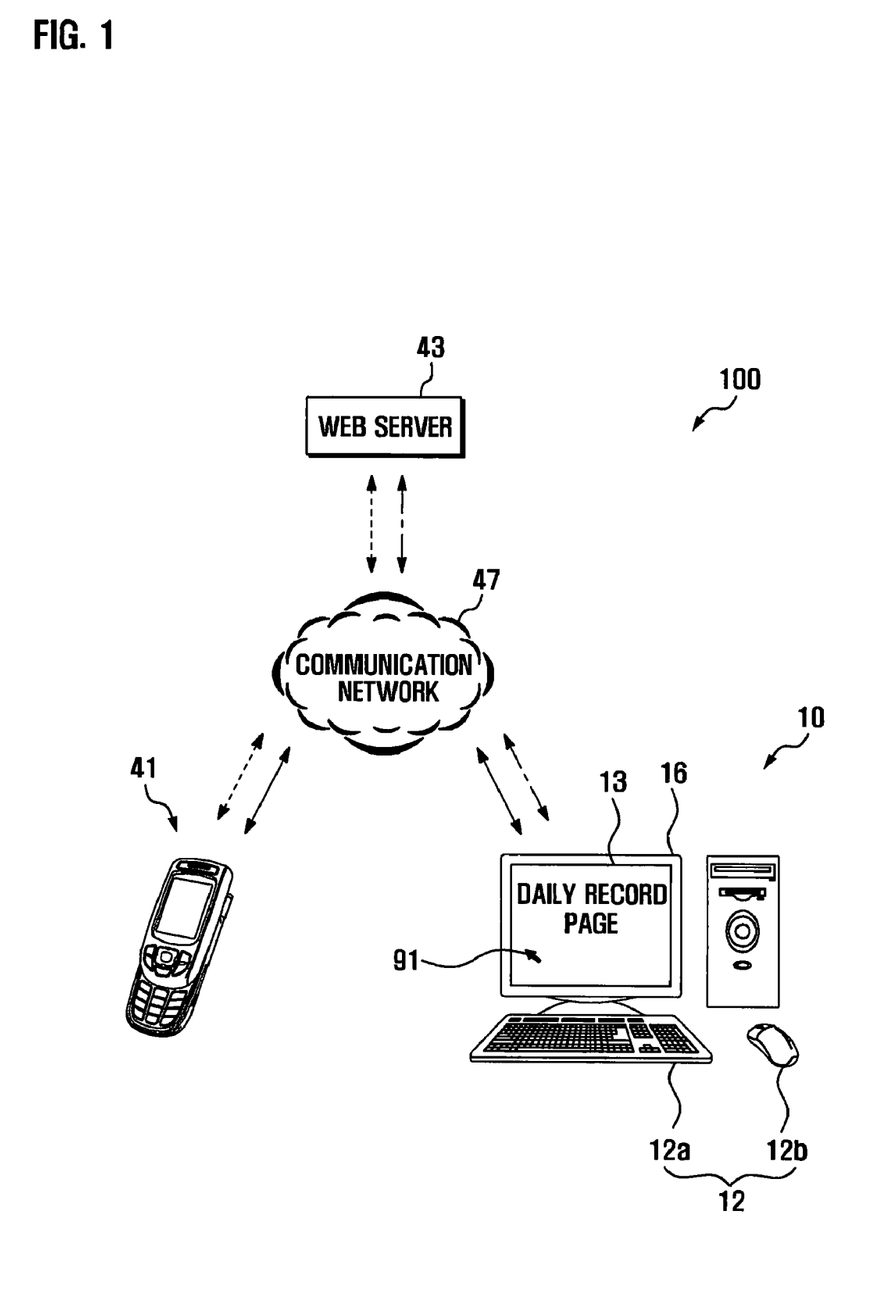
FIG. 1 is a diagram of an image production system using user data of a mobile communication terminal according to an embodiment of the present invention.
Figure 2:
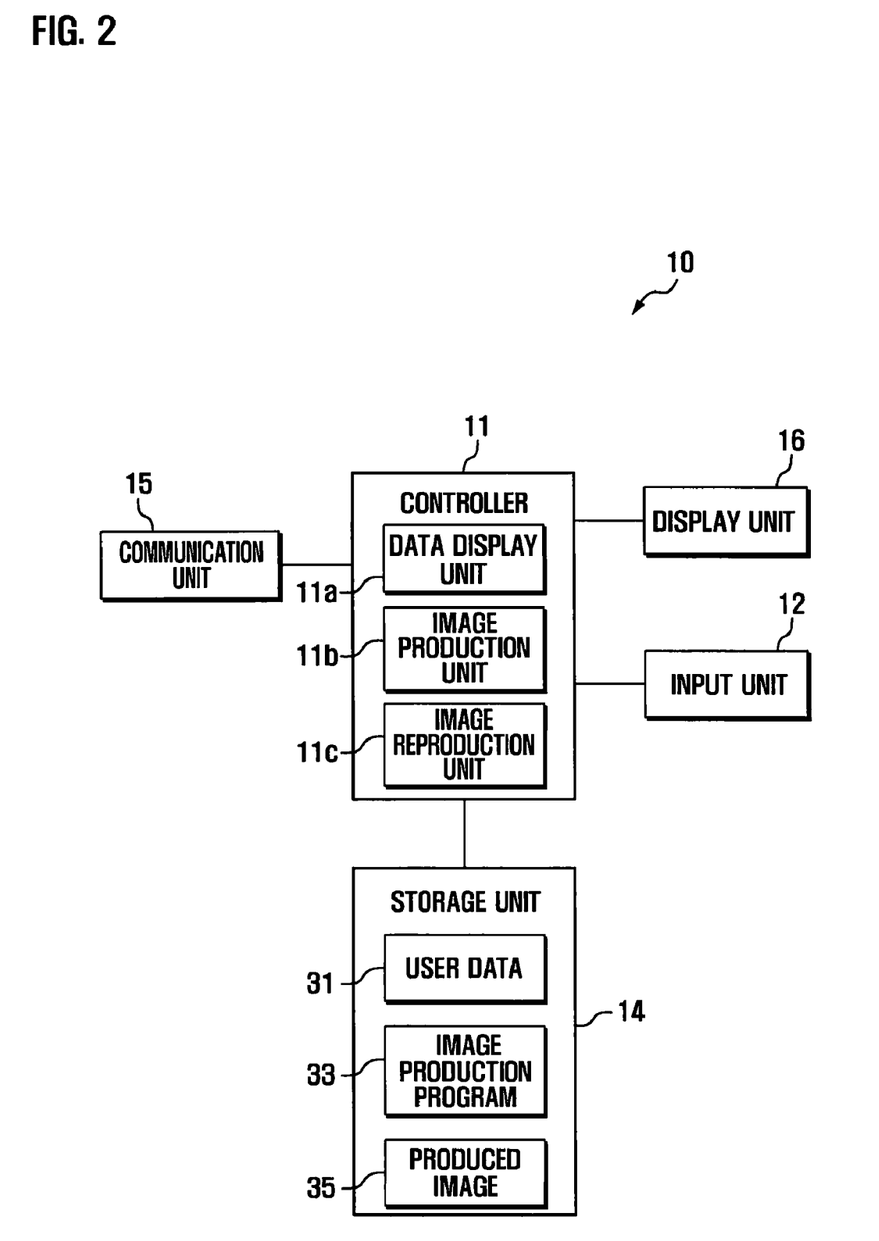
FIG. 2 is a block diagram depicting a configuration of the image production apparatus of FIG. 1.
Figure 3:
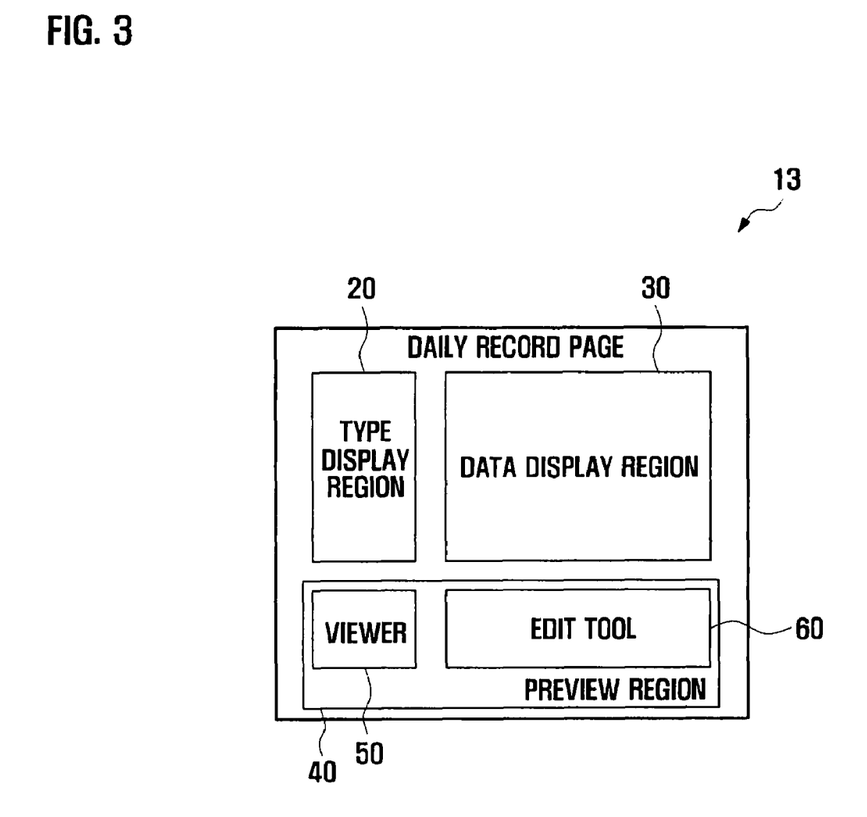
FIG. 3 is a diagram of a configuration of a daily record page displayed on a display unit of the image production apparatus of FIG. 2.
Figure 4:
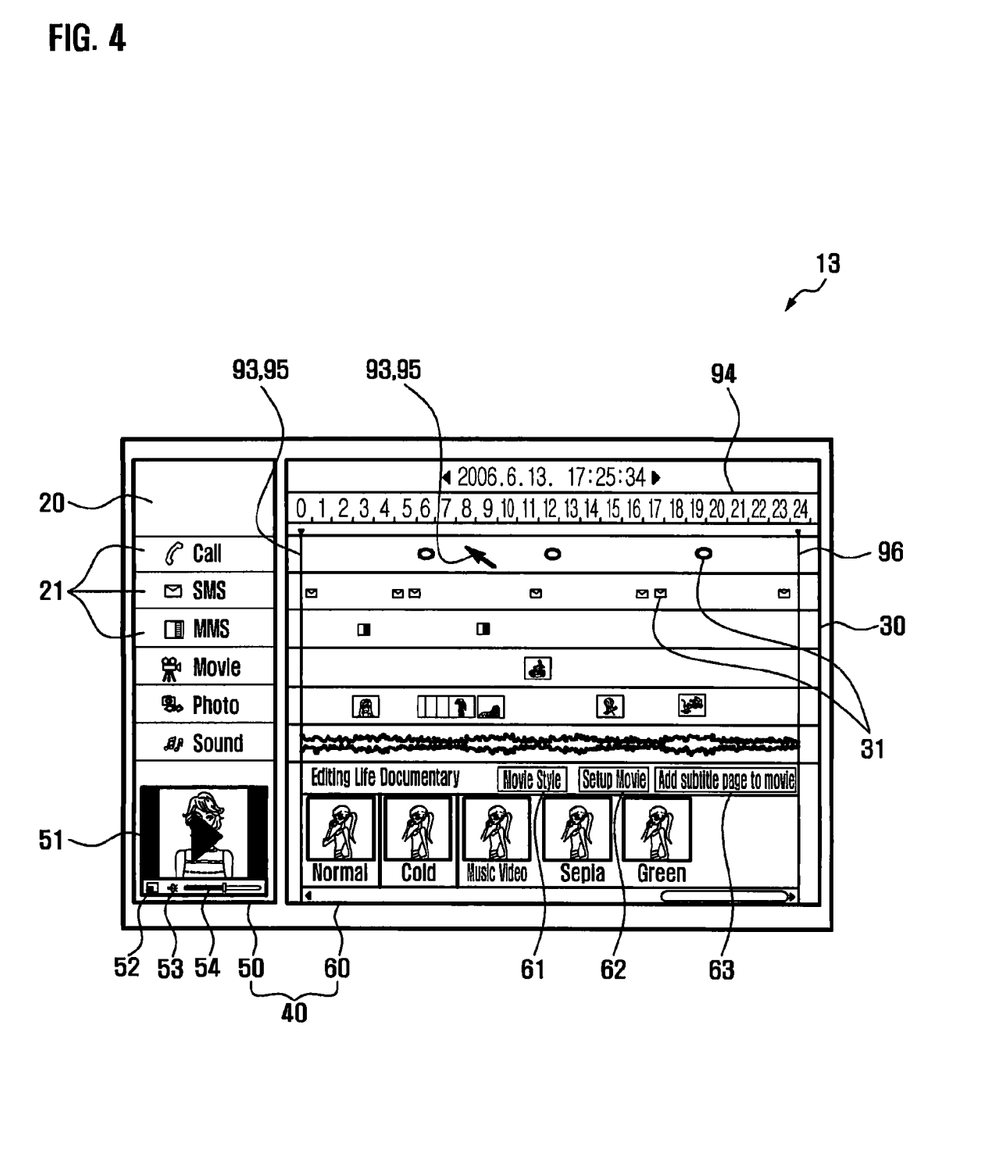
FIG. 4 is a diagram depicting a specific screen of a daily record page.

FIG. 1 is a diagram of an image production system 100 using user data of a mobile communication terminal 41 according to an embodiment of the present invention. FIG. 2 is a block diagram depicting a configuration of the image production apparatus 10 of FIG. 1. FIG. 3 is a diagram of a configuration of a daily record page 13 displayed on a display unit 16 of the image production apparatus 10 of FIG. 2. FIG. 4 is an exemplary view depicting a specific screen of the daily record page 13.

Referring to FIGS. 1 to 4, the image production system 100 is configured to include a mobile communication terminal 41, an image production apparatus 10, and a web server 43 that are wired and/or wirelessly connected to each other over a communication network 47. The communication network 47 is implemented by a wireless communication network, a Packet Switched Network (PSN), an Integrated Services Digital Network (ISDN), a Broadband Integrated Services Digital Network (B-ISDN), etc., each of which forms a network using telephone lines, coaxial cables, and optical fibers, etc.

The mobile communication terminal 41 includes user data 31. The user data 31 includes information on the time the user data was stored in the mobile communication terminal 41.

The image production apparatus 10 receives the user data 31 from the mobile communication terminal 41 through the communication network 47 and produces images using the received user data 31.

The web server 43 is connected to the mobile communication terminal 41 and the image production apparatus 10 via the communication network 47. The web server 43 provides a variety of data, such as photographs, movies, music files, and text files, based on the demands of a user using the mobile communication terminal 41 or the image production apparatus 10.

The image production apparatus 10 can be implemented with communication terminals that perform image production using the user data 31. The image production apparatus 10 is configured to include a controller 11, input unit 12, storage unit 14, communication unit 15, and display unit 16. In an embodiment of the present invention, the image production apparatus 10 is implemented by a computer.

The controller 11 controls the entire operation of the image production apparatus 10. In particular, the controller 11 controls an image production mode where images are produced using the user data 31.

The input unit 12 includes a plurality of keys to operate the image production apparatus 10. The input unit 12 generates key data according to a user's key selection and outputs the key data to the controller 11. A user's selection signal generated through the input unit 12 can execute an image production mode. The input unit 12 also includes a keyboard 12a and a mouse 12b. The user's key selection signals can be selected and input by a pointer 91 of a mouse 12b displayed on the display unit 16.

The storage unit 14 stores application programs for controlling the image production apparatus 10 and data generated as the application programs are operated. The storage unit 14 stores the user data 31 in a user data storage area 14a, an image production program 33 in an image production program storage area 14b for producing images using the user data 31, and images 35 in a produced image storage area 14c produced by the image production program 33. The user data 31 includes call data, a short message of a Short Message Service (SMS), a multimedia message of a Multimedia Messaging Service (MMS), a movie, a photograph, audio data, and a downloaded content, etc.

The communication unit 15 allows its image production apparatus 10 to be coupled to the mobile communication terminal 41 and the web server 43 through the communication network 47. The communication unit 15 includes a Universal Serial Bus (USB) interface, such as a USB cable, which can be connected to the mobile communication terminal 41, a web browser, and a network interface. It is necessary that the web browser and the network interface are connected with the web server 43. The network interface includes a wired/wireless modem or a Local Area Network (LAN) card. The network interface may also be implemented based on software. The communication unit 15 may include short-range wireless communication modules, such as a Bluetooth® (herein after "Bluetooth") communication module, which can perform short-range wireless communication with a mobile communication terminal 41.

The display unit 16 displays a menu related to a variety of functions for executing the image production apparatus 10 as well as data stored in the storage unit 14 in an image format. In particular, the display unit 16 displays a daily record page 13 in an image production mode. The display unit 16 may be implemented with a Cathode Ray Tube (CRT) monitor, a Liquid Crystal Display (LCD) monitor, or a touch screen monitor. The touch screen monitor serves to simultaneously perform displaying and inputting.

The controller 11 is configured to include a data display unit 11a, an image production unit 11b, and an image reproduction unit 11c.

The data display unit 11a sorts the received user data 31 based on the type of the user data 31, provides the sorted user data to the daily record page 13, and displays the daily record page 13 on the display unit 16. That is, the data display unit 11a sorts the user data 31 received from a mobile communication terminal 41. The data display unit 11a extracts user data 31 of a certain time period from the sorted user data 31, and displays the extracted user data 31 on the daily record page 13 according to the time order that the extracted user data 31 had been generated. Here, the certain time period, set by a user, may be set to one day or a shorter duration, for example one hour. FIG. 3 shows a daily record page 13 where the certain time period is set to one day.

As shown in FIGS. 3 and 4, the daily record page 13 is configured to include a type display region 20, a data display region 30, and a preview region 40. The type display region 20 refers to a region displaying types 21 of the user data 31. For example, the types 21 can include items of call data, a short message of a Short Message Service (SMS), a multimedia message of a Multimedia Messaging Service (MMS), a movie, a photograph, audio data, and downloaded content, etc. The items of the types 21 are shown arrayed vertically at the left of the daily record page 13.

The data display region 30 is arrayed adjacent to the type display region 20, and displays the user data 31 according to the time order of the types 21. The user data 31 is displayed as icons on the data display region 30, and linked with the respective types involved in the user data 31. For example, if the items of the types 21 are arrayed vertically, the user data 31 according to the respective types 21 is arrayed horizontally based on the time of their occurrences. A time bar 94, indicative of a certain time period set by a user, is arrayed horizontally at the top of the data display region 30.

The preview region 40 plays back and displays images 35 produced based on the user data 31 as a source, which are selected in the type display region 20 or the data display region 30. The preview region 40 is configured to include a viewer 50 for reproducing and displaying the produced images 35, and an edit tool 60 for editing the produced images 35 that are displayed on the viewer 50. For example, the preview region 40 may be arrayed at the bottom of the type display region 20 and the data display region 30.

The viewer 50 includes a screen 51 for displaying reproduced images, a size-adjusting button 52 located at the lower portion of the screen 51, a volume-adjusting button 53, and an image proceeding bar 54.

The edit tool 60 includes an image style menu 61 for selecting representation methods of produced images 35, a setting menu 62 for setting an image production method, and a sub-title adding menu 63 for adding a sub-title to the produced images 35. For example, the image style menu 61 can select an original image or a music video, and black and white toning, sepia toning, or green toning.

The image production unit 11b produces images based on the user data 31 as a source, which is selected from displayed user data 31 according to a user's selection signal. The user data 31 can be selected from the types 21 of the type display region 20 or from the data display region 30. When one of the types 21 of the type display region 20 is selected, the image production unit 11b uses all the user data 31, included in the selected type 21, as an image source. If one element of the user data 31 is selected in the data display region 30, the image production unit 11b uses the selected user data 31 as an image source. The image production unit 11b can delete at least one of the user data selected according to a user's selection signal, or may add new user data 31.

The image production unit 11b may store or delete images 35 produced according to a user's selection signal in or from the storage unit 14.

The image reproduction unit 11c reproduces and displays produced images 35 on the display unit 16. That is, the image reproduction unit 11c reproduces the produced images 35 in a certain region of the daily record page 13. The certain region refers to a display screen of the viewer 50.

The image reproduction unit 11c can play back selected user data 31 in various image reproduction methods. For example, the image reproduction unit 11c can sequentially play back images from the user data firstly stored in the mobile communication terminal 41. The image reproduction unit 11c can also randomly play back selected user data 31. The image reproduction unit 11c can play back the produced images 35 according to a selected image representation method. Such an image reproduction method can be set through the setting menu 62 of the edit tool 60.

If the produced images 35 are reproduced through the viewer 50, the image reproduction unit 11c allows a proceeding bar 95 to move from a starting time position 93 within a certain time period to a final time position 96. The proceeding bar may be implemented in such a way to array in the data display region 30 vertically. FIG. 6D shows a state where the proceeding bar 95 is moving from a starting position 93 to an end position 96.

If the produced images 35 include a plurality of user data 31, they can be displayed in a slide show, movie, or flash format.

According to the present invention, all the user data 31 of the mobile communication terminal 41 can be reviewed through the daily record page 13. Images can be produced based on the user data 31 of the mobile communication terminal.

Although, in the embodiment of the present invention, the image production apparatus 10 is implemented by a computer of the communication terminals, it will be appreciated that the embodiment does not restrict the present invention. That is, the image production apparatus 10 may be applied to the mobile communication terminal 41 or the web server 43.

Figure 5A:
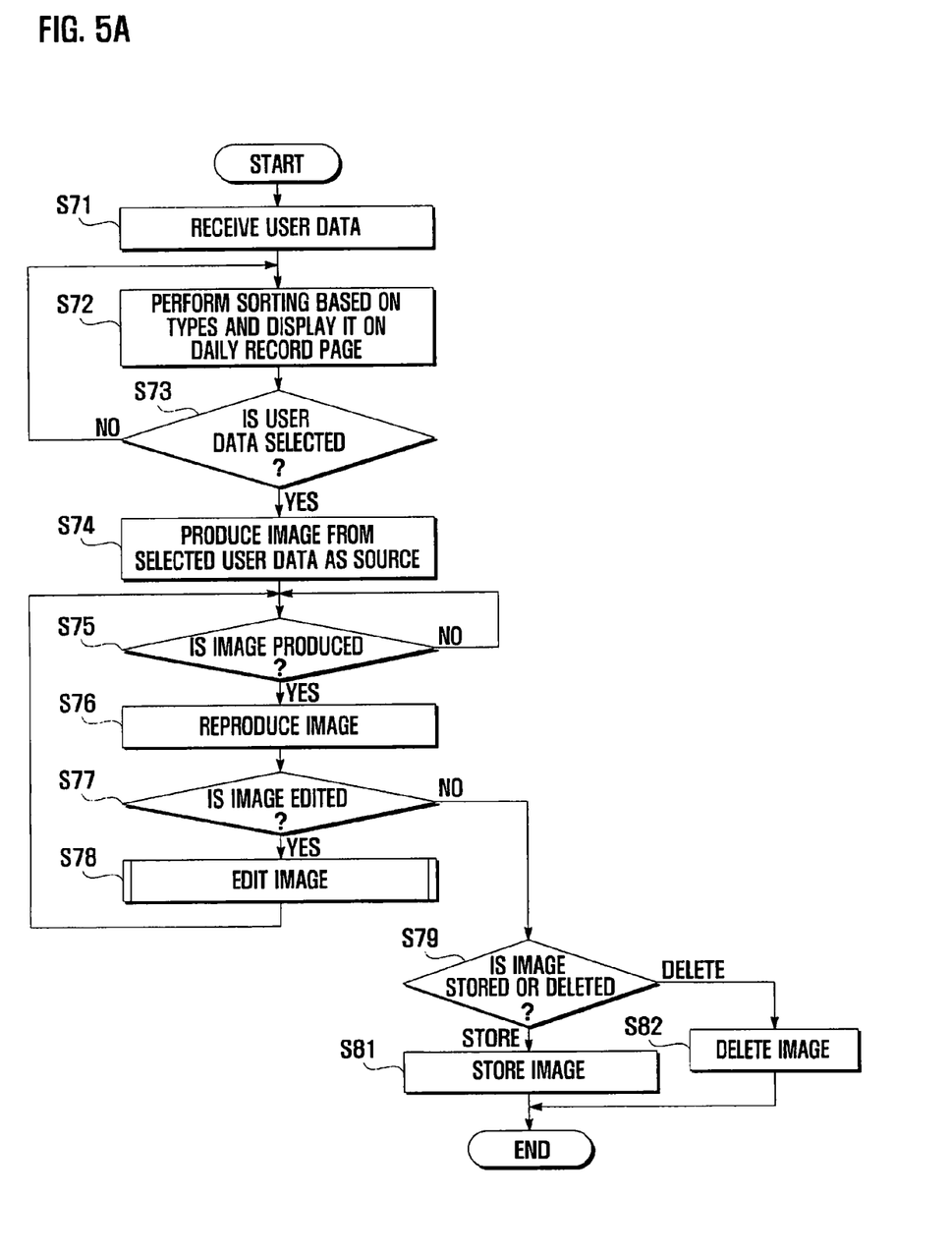
FIG. 5A and FIG. 5B are flow charts of an image production method using user data of a mobile communication terminal according to an embodiment of the present invention.
Figure 5B:
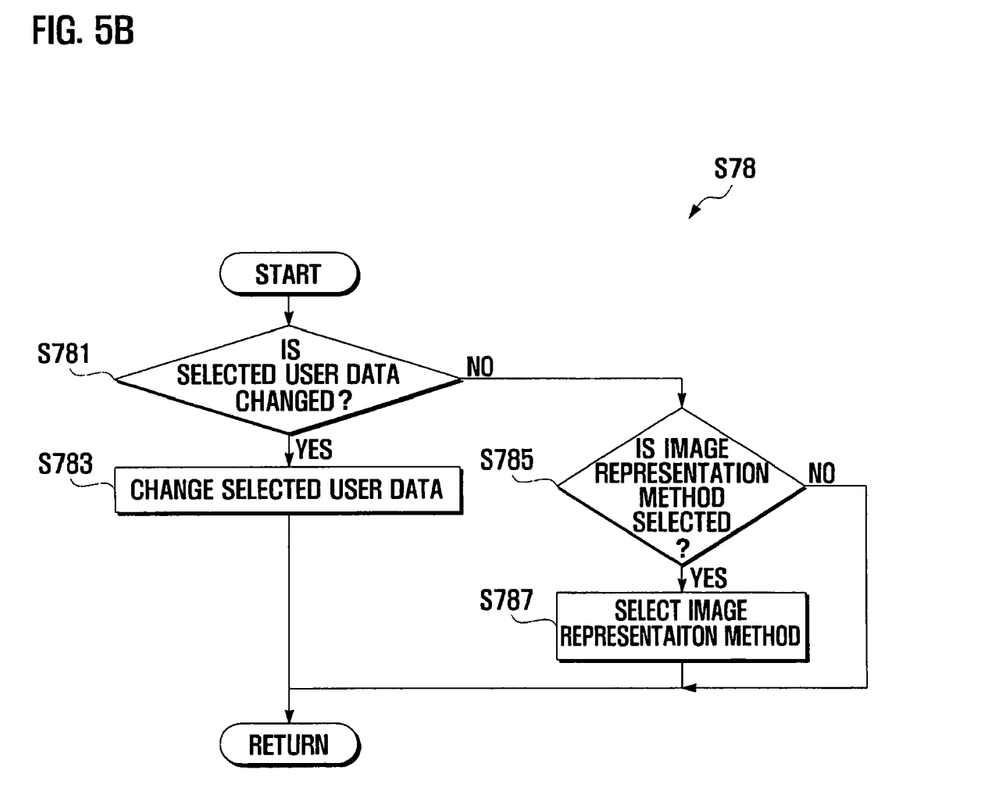

FIG. 5A and FIG. 5B are flow charts of an image production method using user data 31 of a mobile communication terminal 41 according to an embodiment of the present invention. In the following description, a user's selection signal is deemed to be a signal inputted through the input unit 12.

Referring to FIGS. 1 to 5B, if an image production mode is performed, an image production apparatus 10 receives at step S71 user data 31 from a mobile communication terminal 41 according to a user's selection signal. The image production apparatus 10 receives the user data 31 directly from the mobile communication terminal 41 through a communication network 47. The image production apparatus 10 also receives the user data 31 from a web server 43 through the communication network 47.

At step S72 the data display unit 11a sorts the received user data 31 based on its types and displays the sorted user data on a daily record page 13. That is, the data display unit 11a extracts the user data 31 of a certain time period from the sorted user data 31 and displays it on the daily record page 13 in the order that the user data 31 was created. Therefore, a user can check the user data sorted based on its types, which is shown in the daily record page 13 on the display unit 16.

The image production unit 11b at step S73 determines if the user data 31 shown in the daily record page 13 is selected. The user data 31 can be selected through the input unit 12.

If the user data 31 has not been selected in step S73, the data display unit 11a continues to display the daily record page 13 of step S72.

If the user data 31 has been selected in step S73, the image production unit 11b in step S74 produces an image from the selected user data 31 as a source. Here, at least one of the type 21 in the type display region 21 or of the user data 31 in the data display region 30 can be selected through the input unit 12.

The image reproduction unit 11c at step S75 determines if a user selection signal for playing images is inputted. If the user's selection signal for playing back images has been input in S75, the image reproduction unit 11c at step S76 plays back the produced images 35. That is, when a screen 51 of a viewer 50 is selected using a pointer 91, the image reproduction unit 11c displays the produced images 35 on the screen 51. When a size-adjusting button 52 of the viewer 50 is selected, the image reproduction unit 11c magnifies the screen 51 and displays it on the daily record page 13. Therefore, the user can check the produced images 35 through the screen 51 of the viewer 50.

The image reproduction unit 11c at step S77 determines whether a user's selection signal for editing images is input.

When the user's selection signal for editing images has not been inputted in step S77, the image production unit 11b at step S79 determines if a user's signal for storing or deleting the produced images 35 is inputted.

If the user's signal for storing the produced images 35 has been inputted in S79, the image production unit 11b at step S81 stores the produced images 35 in a storage unit 14. If the user's signal for deleting the produced images 35 has been inputted in S79, the image production unit 11b at step S82 deletes the produced images 35. In the process of deleting the produced images 35, the image production unit 11b may, or may not, delete the user data 31 having been used for the produced images 35, according to the user's selection signal.

When the user's selection signal for editing images has been input in step S77, the image production unit 11c and the image reproduction unit 11c at step S78 edit images, which is described in detail below, referring to FIG. 5B.

The image production unit 11b at step S781 determines if a user's selection signal for changing the selected user data 31 is input.

If the user's selection signal for changing the selected user data 31 has been input in step S781, the image production unit 11b at step S783 changes the selected user data 31. That is, the image production unit 11b may delete at least one of the selected user data 31, which was selected according to the user's selection signal, or may add new user data 31.

If the user's selection signal for changing the selected user data 31 has not been input in step S781, the image reproduction unit 11c at step S785 determines if a user's selection signal for selecting an image representation method of the produced images 35 is input.

If the user's selection signal for selecting an image representation method has been input in step S785, the image reproduction unit 11c at step S787 selects an image representation method.

As step S78 shown in FIG. 5B is completed and then steps S75 and S76 are performed according to a user's selection signal, the user can check the edited images. As steps S75 to S78 are performed according to a user's selection signal, the edited image can be re-edited and checked repeatedly. The edited image can be stored or deleted through steps S79 to S82.

The image production method according to an embodiment of the present invention is described in detail referring to FIG. 6A to FIG. 6E showing exemplary views depicting screens for a daily record page.

Figure 6A:
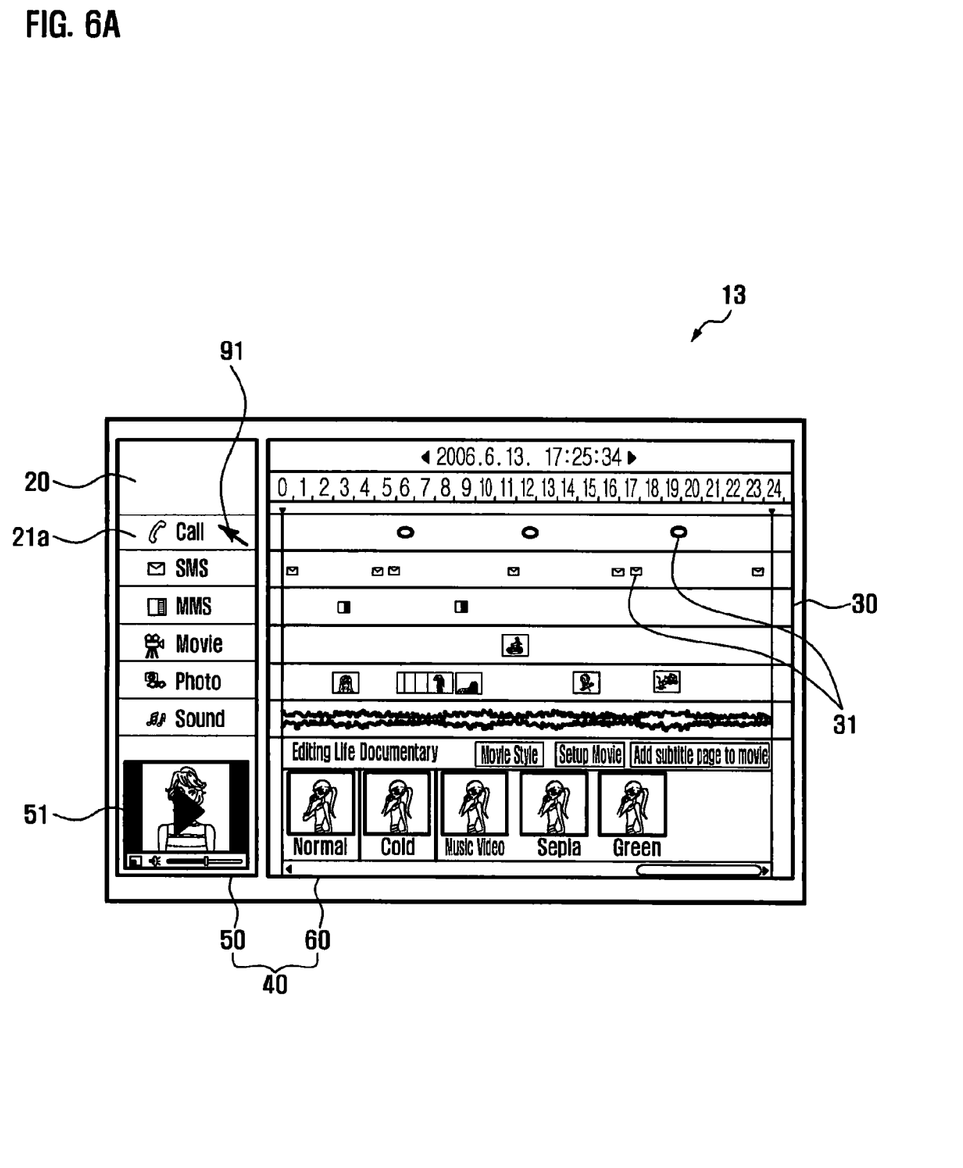
FIG. 6A to FIG. 6E are exemplary views depicting screens through the image production method according to an embodiment of the present invention.

As shown in FIG. 6A, the user data 31 received from a mobile communication terminal is sorted and displayed on a daily record page 13.

Figure 6B:
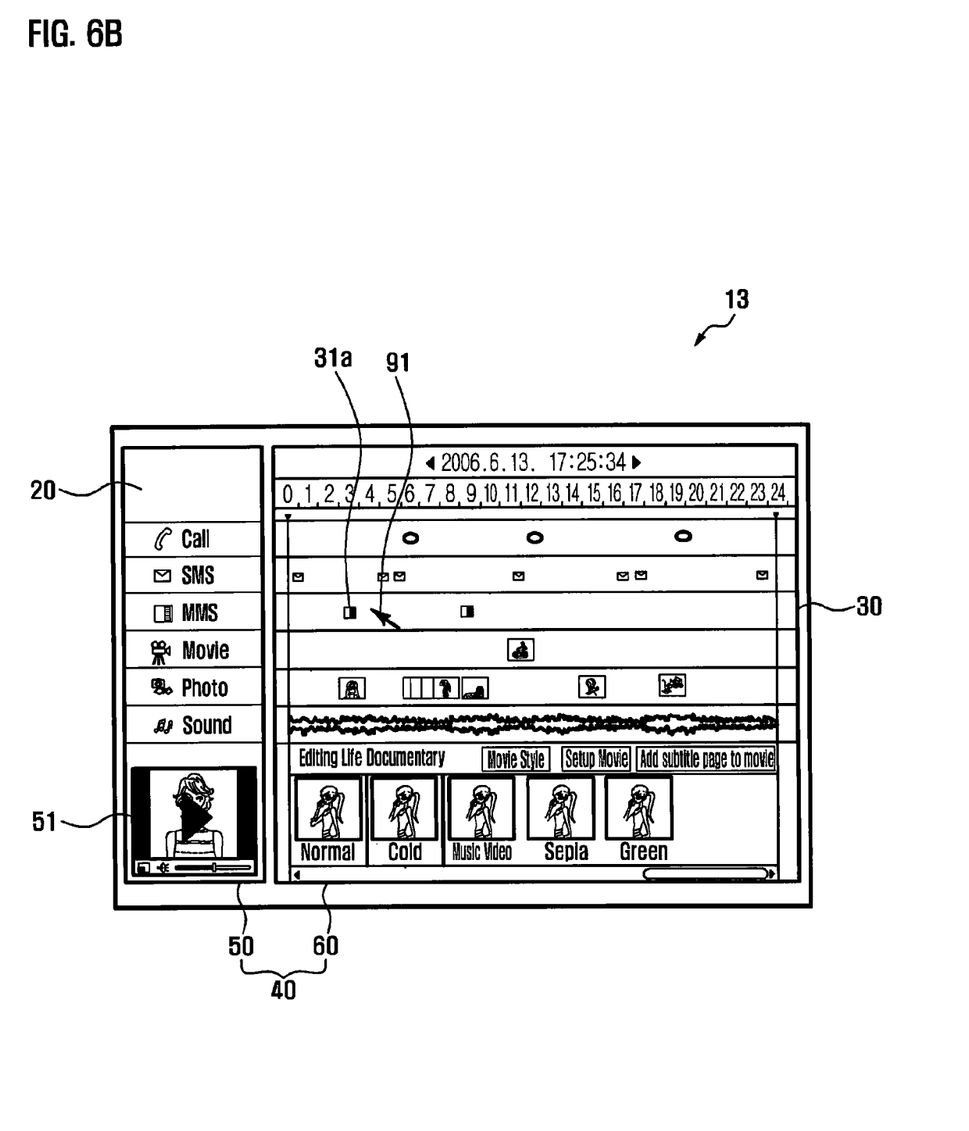

As shown in FIG. 6A, a user can select at least one type (a particular type 21a) in the type display region 20 using a pointer 91 through the input unit 12. As shown in FIG. 6B, the user can select at least one piece of user data (a particular user data 31a) in the data display region 30 using a pointer 91 through the input unit 12. In an embodiment of the present invention, the particular type 21a is implemented with a call and the particular piece of user data 31a is implemented with a certain multimedia message in a multimedia message item.

Figure 6C:
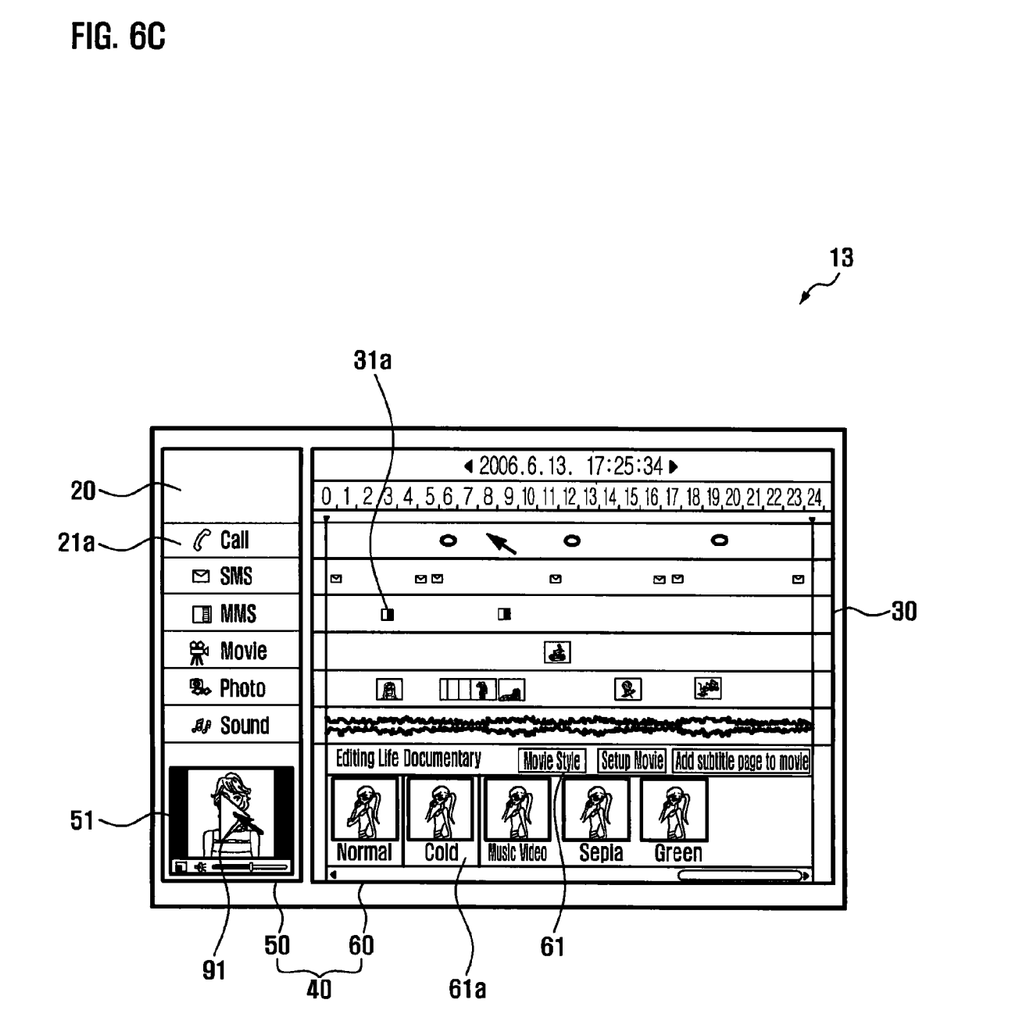
Figure 6D:
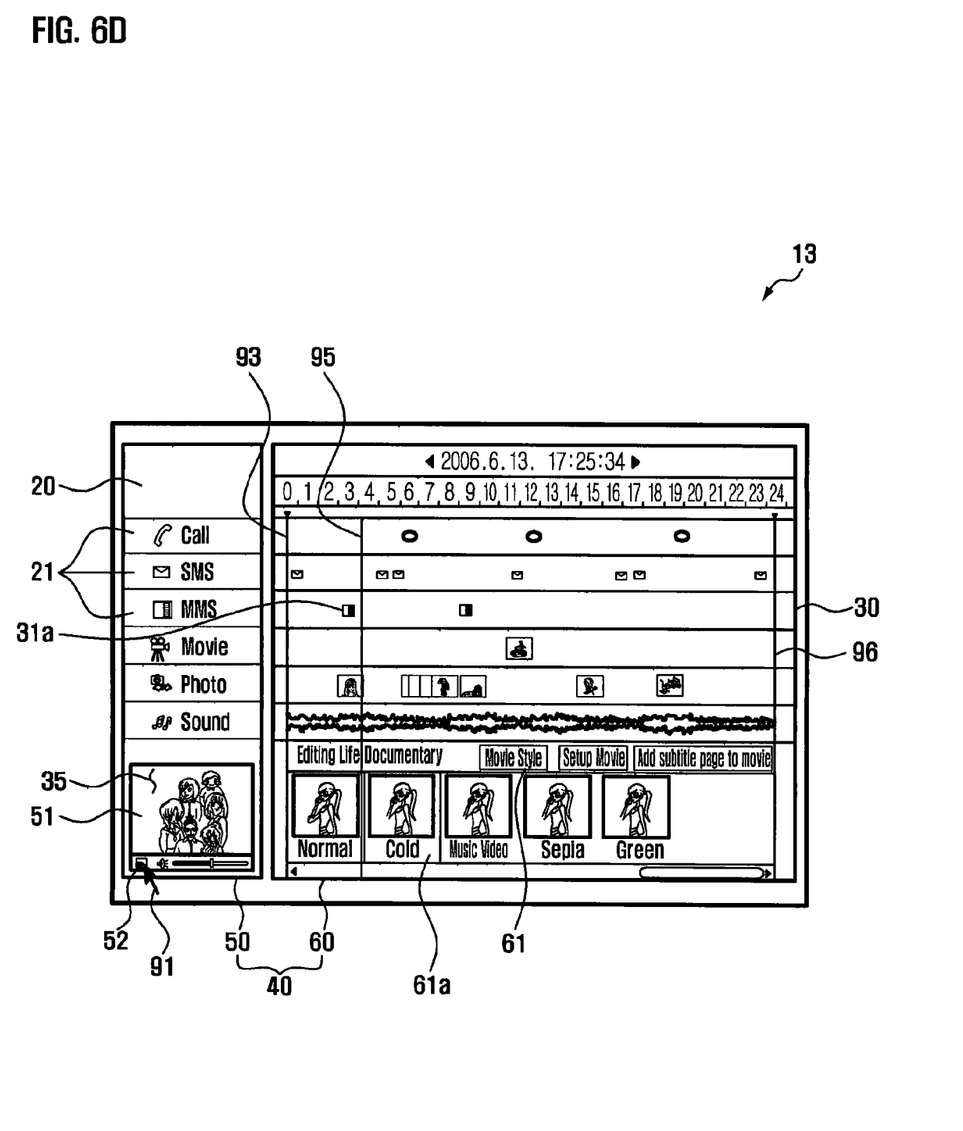

If a screen 51 of a viewer 50 is selected through the input unit 12, as shown in FIG. 6C, images 35 produced from selected user data 31 as a source are played back and displayed on the screen 51 as shown in FIG. 6D. The embodiment of the present invention discloses an exemplary example where a black and white representation method 61a is selected in an image style menu 61.

Figure 6E:
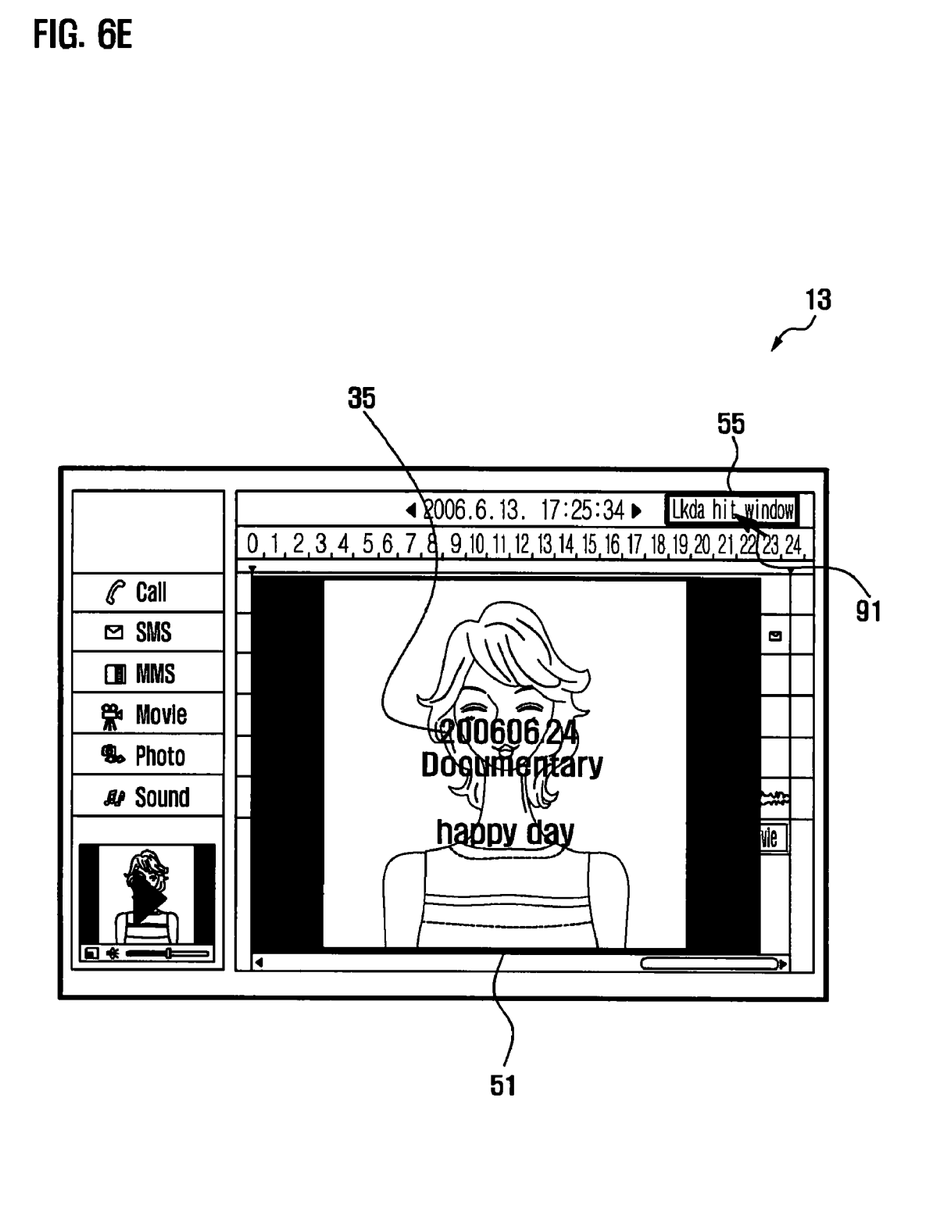

If the user selects a size-adjusting button 52 of a viewer 50 using a pointer 91 through the input unit 12, as shown in FIG. 6D, the screen 51 of the viewer 50 is magnified and displayed on the daily record page 13 as shown in FIG. 6E. If the right corner portion 55 of the screen 51 of the magnified viewer is selected by the pointer 91, the screen 51 disappears from on the daily record page 13 as shown in FIG. 6D.

As described above, the present invention makes it easy to produce images from user data of a mobile communication terminal. The images are produced from user data of a mobile communication terminal, which are selected by a user and collected, and thus the user can play back the produced images and read the selected data. The images produced using user data may also be utilized as an image diary.

Since the user data of a mobile communication terminal can be sorted based on the type of the user data and displayed on a daily record page, all of the user data for a certain time period can be checked through the daily record page.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for producing images using user data of a mobile communication terminal, comprising:
   sorting user data received from the mobile communication terminal based on at least one type of the user data;
   extracting user data of a certain time period from the sorted user data and displaying on a daily record page the user data in an order that the user data was created;
   producing the images from user data which is selected from the displayed user data; and
   playing back the produced images on a region of the daily record page,
   wherein the daily record page comprises:
   a type display region for displaying the types of the user data;
   a data display region adjacent to the type display region, for displaying the user data based on the type in time order; and
   a preview region for playing back and displaying the images produced based on the user data, which are selected in the type display region or the data display region.

2. The method of claim 1, wherein the user data comprises at least one of call data, a short message of a Short Message Service (SMS), a multimedia message of a Multimedia Messaging Service (MMS), a movie, a photograph, audio data, and a downloaded content.

3. The method of claim 1, wherein the certain time period is one day or less.

4. The method of claim 1, wherein the user data is displayed as icons on the data display region, and is linked with the respective types of the type display region, which is associated with the user data.

5. The method of claim 4, wherein the user data for producing the images are selected in the type display region or the data display region.

6. The method of claim 5, wherein the playing back of the produced images plays back the selected user data in the order that the user data was stored in the mobile communication terminal.

7. The method of claim 5, wherein the playing back of the produced images randomly plays back the selected user data.

8. The method of claim 5, wherein producing the images further comprises:
   deleting selected user data or adding new user data.

9. The method of claim 8, wherein the playing back of the produced images comprises:
   selecting an image representation method of the produced images; and
   playing back the produced images according to the selected image representation method.

10. An apparatus for producing images using user data of a mobile communication terminal, comprising:
    a mobile communication terminal comprising the user data;

a data display unit for sorting user data received from the mobile communication terminal based on at least one type of the user data, extracting user data of a certain time period from the sorted user data, and displaying on a daily record page the user data in the order that the user data was created;

an image production unit for producing the images from user data selected from the displayed user data; and an image reproduction unit for playing back the produced images on a region of the daily record page wherein the daily record page comprises:

a type display region for displaying the types of the user data;

a data display region adjacent to the type display region, for displaying the user data based on the type in the time order; and a preview region for playing back and displaying the images produced based on the user data which are selected in the type display region or the data display region.

11. The apparatus of claim 10, wherein the user data comprises at least one of call data, a short message of a Short Message Service (SMS), a multimedia message of a Multimedia Messaging Service (MMS), a movie, a photograph, audio data, and a downloaded content.

12. The apparatus of claim 11, wherein the certain time period is one day or less.

13. The apparatus of claim 10, wherein the user data is displayed as icons on the data display region, and linked with the respective types of the type display region, which are involved in the user data.

14. The apparatus of claim 13, wherein the user data for producing the images is selected in the type display region or the data display region.

15. The apparatus of claim 14, wherein the image reproduction unit plays back the selected user data in the order that the user data was stored in the mobile communication terminal.

16. The apparatus of claim 14, wherein the image reproduction unit randomly plays back the selected user data.

17. The apparatus of claim 14, wherein the image production unit deletes the selected user data or adds new user data, according to a user's selection signal.

18. The apparatus of claim 17, wherein the image reproduction unit selects an image representation method of the produced images and plays back the produced images according to the selected image representation method, and wherein the image representation method comprises at least one of an original image, a music video image, black and white toning, sepia toning, and green toning.

19. A system for producing images using user data of a mobile communication terminal, comprising:

a mobile communication terminal containing the user data; and an image production apparatus for receiving the user data from the mobile communication terminal and for producing the images based on the received user data, comprising:

a data display unit for sorting the user data received from the mobile communication terminal based on at least one type of the user data, extracting user data of a certain time period from the sorted user data, and displaying on a daily record page the user data in the order that the user data was created;

an image production unit for producing the images from user data selected from the displayed user data; and an image reproduction unit for playing back the produced images on a region of the daily record page, wherein the daily record page comprises:

a type display region for displaying the types of the user data;

a data display region adjacent to the type display region, for displaying the user data based on the type in the time order; and a preview region for playing back and displaying the images produced based on the user data, which are selected in the type display region or the data display region.

* * * * *